(12) United States Patent
Kim et al.

(10) Patent No.: US 9,811,501 B2
(45) Date of Patent: Nov. 7, 2017

(54) LOCAL PROCESSING APPARATUS AND DATA TRANSCEIVING METHOD THEREOF

(71) Applicant: Korea Electronics Technology Institute, Seongnam-si, Gyeonggi-do (KR)

(72) Inventors: Bong Jae Kim, Bucheon-si (KR); Hye Dong Jung, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 113 days.

(21) Appl. No.: 14/926,850

(22) Filed: Oct. 29, 2015

(65) Prior Publication Data

US 2017/0116152 A1 Apr. 27, 2017

(30) Foreign Application Priority Data

Oct. 23, 2015 (KR) ........................ 10-2015-0148331

(51) Int. Cl.
*H04L 29/08* (2006.01)
*G06F 15/167* (2006.01)
*G06N 7/00* (2006.01)

(52) U.S. Cl.
CPC ........... *G06F 15/167* (2013.01); *G06N 7/005* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 9,372,826 | B2* | 6/2016 | Guerin | G06F 15/17331 |
| 9,378,179 | B2* | 6/2016 | Guerin | G06F 15/17331 |
| 9,632,936 | B1* | 4/2017 | Zuckerman | G06F 12/0855 |
| 9,633,060 | B2* | 4/2017 | Caudy | G06F 15/17331 |
| 2008/0007757 | A1* | 1/2008 | Worrall | G06F 17/30091 |
| | | | | 358/1.13 |
| 2008/0016106 | A1* | 1/2008 | Worrall | G06F 17/30091 |
| 2008/0215849 | A1* | 9/2008 | Scott | G06F 17/30949 |
| | | | | 711/216 |

(Continued)

FOREIGN PATENT DOCUMENTS

| | | |
|---|---|---|
| KR | 10-2006-0074809 A | 7/2006 |
| KR | 10-2010-0039180 A | 4/2010 |

(Continued)

OTHER PUBLICATIONS

Korean Patent Office; Communication dated Aug. 11, 2016 in counterpart application No. 10-2015-0148331.

*Primary Examiner* — Ninos Donabed
(74) *Attorney, Agent, or Firm* — Sughrue Mion, PLLC (57) ABSTRACT

A local processing apparatus and a data transceiving method thereof are provided. The local processing apparatus includes a communication module configured to transceive the data with the one or more distributed storage units, a memory configured to store a program for transceiving the data and the one or more key-value data pairs, and a processor configured to execute the program, the processor confirms whether a first key-value data exists in the memory by executing the program, and determines whether to prefetch one or more key-value data corresponding to the first key-value data based on the confirmation result.

11 Claims, 4 Drawing Sheets

(56) References Cited

U.S. PATENT DOCUMENTS

| | | | |
|---|---|---|---|
| 2011/0173396 A1* | 7/2011 | Sugumar | G06F 12/1081 |
| | | | 711/137 |
| 2011/0258532 A1* | 10/2011 | Ceze | G06F 17/30902 |
| | | | 715/234 |
| 2011/0307533 A1* | 12/2011 | Saeki | G06F 17/3048 |
| | | | 707/822 |
| 2011/0320403 A1* | 12/2011 | O'Krafka | G06F 17/30581 |
| | | | 707/620 |
| 2014/0317223 A1 | 10/2014 | Park et al. | |
| 2015/0026449 A1 | 1/2015 | Heo et al. | |
| 2015/0067088 A1* | 3/2015 | Guerin | G06F 15/167 |
| | | | 709/213 |
| 2016/0105511 A1* | 4/2016 | Guerin | G06F 15/167 |
| | | | 709/212 |
| 2016/0210263 A1* | 7/2016 | Guerin | G06F 15/167 |
| 2016/0269502 A1* | 9/2016 | Guerin | G06F 15/17331 |
| 2016/0366226 A1* | 12/2016 | Friedman | H04L 67/1097 |

FOREIGN PATENT DOCUMENTS

| | | |
|---|---|---|
| KR | 10-2012-0068464 A | 6/2012 |
| KR | 10-2014-0125930 A | 10/2014 |

* cited by examiner

LOCAL PROCESSING APPARATUS AND DATA TRANSCEIVING METHOD THEREOF

CROSS-REFERENCE TO RELATED APPLICATION

This application claims priority to and the benefit of Korean Patent Application No. 2015-0148331, filed on Oct. 23, 2015, the disclosure of which is incorporated herein by reference in its entirety.

BACKGROUND

1. Field of the Invention

Exemplary embodiments of the present invention relate to a local processing apparatus and a data transceiving method thereof.

2. Discussion of Related Art

Conventional key-value storage technology for storing data of a key-value pair like remote dictionary system (Redis), Memcached, and MongoDB stores data using a value matched with a specific key as a pair in a plurality of distributed servers. When referring to the data, the key-value storage technology increases computer performance by searching for and processing data which is distributed and stored in a plurality of distributed storage units using a corresponding key.

The data processing operation shows high-speed performance because of processing the data in-memory.

Meanwhile, high-speed network communication technology, such as infiniband, which is mainly used when configuring a cluster computing system, supports a remote direct memory access (hereinafter, it may be referred to as RDMA)-based data transceiving function between computing nodes configuring a cluster regardless of a central processing unit (CPU).

In this case, the RDMA is a direct memory access from a memory of one computer to another computer memory without intervention of an operating system of the another computer.

The high performance network technology supporting the RDMA like the infiniband has a feature in which, when a size of a data transmission is relatively small, even though the size of the data transmission becomes large, a delay of the data transmission is not increased in proportion to the size of the data transmission.

However, the key-value storage technology according to a conventional art has a problem in which it is not associated with the high performance network technology supporting the RDMA like the infiniband.

That is, the conventional technology has a problem in which, although it is possible to improve processing performance by decreasing an additional communication network load through a data prefetching considering a data reference pattern, it does not include an active prefetching function.

Regarding this, Korean Patent Publication No. 10-2009-0032821 (title: prefetching method of hard disk drive, recording medium for the same, and apparatus for the same) discloses a technology for detecting whether a logical block address (LBA) of data requested by an external device is stored in a history of a non-volatile cache, and when the LBA of the requested data is stored in the history, storing data stored in an LBA which is a next order of the LBA of the requested data among the LBAs stored in the history in a buffer.

SUMMARY OF THE INVENTION

The present invention is directed to a local processing apparatus and a data transceiving method capable of decreasing a communication network load occurring when fetching data from a distributed storage unit located in a remote place by determining whether to prefetch one or more key-value data which are next referenced considering a reference pattern for key-value data.

The above and other objects, features and advantages of the present invention will become more apparent to those of ordinary skill in the art by describing in detail exemplary embodiments thereof with reference to the accompanying drawings.

According to one aspect of the present invention, there is provided a local processing apparatus transceiving data with one or more distributed storage units in which one or more key-value data pairs are stored, respectively, including a communication module configured to transceive the data with the one or more distributed storage units, a memory configured to store a program for transceiving the data and the one or more key-value data pairs, and a processor configured to execute the program, wherein the processor confirms whether a first key-value data exists in the memory by executing the program, and determines whether to prefetch one or more key-value data corresponding to the first key-value data based on the confirmation result, a reference pattern for the one or more key-value data which are next referenced by each key-value data is stored in the memory based on a probability value, and the processor determines whether to prefetch the key-value data based on a transmission size of the key-value data and a transmission delay time corresponding to the transmission size.

According to another aspect of the present invention, there is provided a data transceiving method of a local processing apparatus transceiving data with one or more distributed storage units in which one or more key-value data pairs are stored, respectively, including confirming whether a first key-value data is stored in a memory of the local processing apparatus, and determining whether to prefetch one or more key-value data corresponding to the first key-value data based on the confirmation result, wherein a reference pattern for the one or more key-value data which are next referenced by each key-value data is stored in the memory, and the prefetching of the key-value data is determined based on a transmission size of the key-value data and a transmission delay time corresponding to the transmission size.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the inventive concept will be described in detail with reference to the accompanying drawings to allow those of ordinary skill in the art to embody the inventive concept easily. The inventive concept may be implemented in various forms, and is not limited to exemplary embodiments described herein. In order to clearly describe the inventive concept, portions which are not related to a description of the inventive concept will be omitted.

It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, a local processing apparatus 100 according to an exemplary embodiment of the inventive concept will be described with reference to FIGS. 1 to 3.

Figure 1:
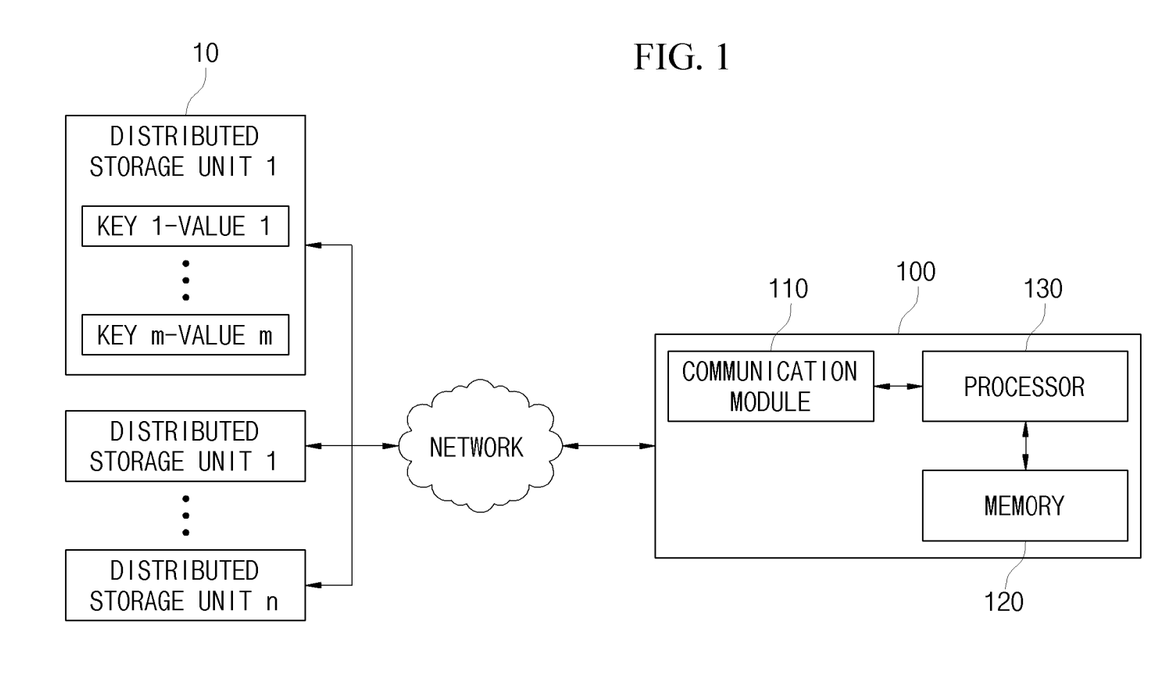
FIG. 1 is a block diagram illustrating a local processing apparatus according to an exemplary embodiment of the inventive concept.

FIG. 1 is a block diagram illustrating the local processing apparatus 100 according to an exemplary embodiment of the inventive concept.

The local processing apparatus 100 according to an exemplary embodiment of the inventive concept may transceive data with one or more distributed storage units 10.

In this case, one or more key-value data pairs may be stored in each of the one or more distributed storage units 10. That is, as shown in FIG. 1, data "key 1-value 1", . . . , and "key m-value m" in which a key and a value are paired may be stored in "distributed storage unit 1", and the key-value data pairs may be stored in each of other distributed storage units.

The local processing apparatus 100 may simultaneously prefetch one or more key-value data pairs having a high possibility which are next referenced considering a reference pattern of the key-value data from the distributed storage unit 10.

That is, the local processing apparatus 100 may determine whether to receive the key-value data stored in the distributed storage unit 10 one by one, or to prefetch the key-value data by considering a transmission size and a transmission delay time of data, and simultaneously receive the key-value data.

Meanwhile, the local processing apparatus 100 may be connected to each distributed storage unit 10 through a network. In this case, the network may denote a connection structure capable of exchanging information between nodes such as terminals and servers. Examples of the network may include a third generation partnership project (3GPP) network, a long term evolution (LTE) network, a world interoperability for microwave access (WIMAX) network, an Internet, a local area network (LAN), a wireless local area network (WLAN), a wide area network (WAN), a personal area network (PAN), a Bluetooth network, a satellite broadcasting network, an analog broadcasting network, a digital multimedia broadcasting network, etc., but are not limited thereto.

Particularly, the network according to an exemplary embodiment of the inventive concept may be a high performance network supporting the RDMA like infiniband.

The local processing apparatus 100 may include a communication module 110, a memory 120, and a processor 130.

The communication module 110 may transceive data with one or more distributed storage units 10. In this case, the communication module 110 may transceive data with the one or more distributed storage units 10 through the infiniband supporting the RDMA.

In addition, the communication module 110 may include a wired communication module and a wireless communication module. The wired communication module may be implemented as a power line communication device, a telephone line communication device, CableHome (Multimedia over Coax Alliance (MoCA)), an Ethernet, IEEE1294, an integrated wired home network, and an RS-485 control apparatus. Further, the wireless communication module may be implemented as a WLAN, Bluetooth, a high data rate wireless PAN (HDR WPAN), an ultra wideband, Zigbee, an impulse radio, a 60 GHz WPAN, a binary-code division multiple access (CDMA), a wireless universal serial bus (USB) technology, and a wireless high definition multimedia interface (HDMI) technology, etc.

The memory 120 may store a program for transceiving data. The memory 120 may store one or more key-value data pairs. Further, the memory 120 may store a reference pattern for the one or more key-value data which are next referenced by each key-value data based on a probability value. The reference pattern will be described with reference to FIG. 2.

Figure 2:
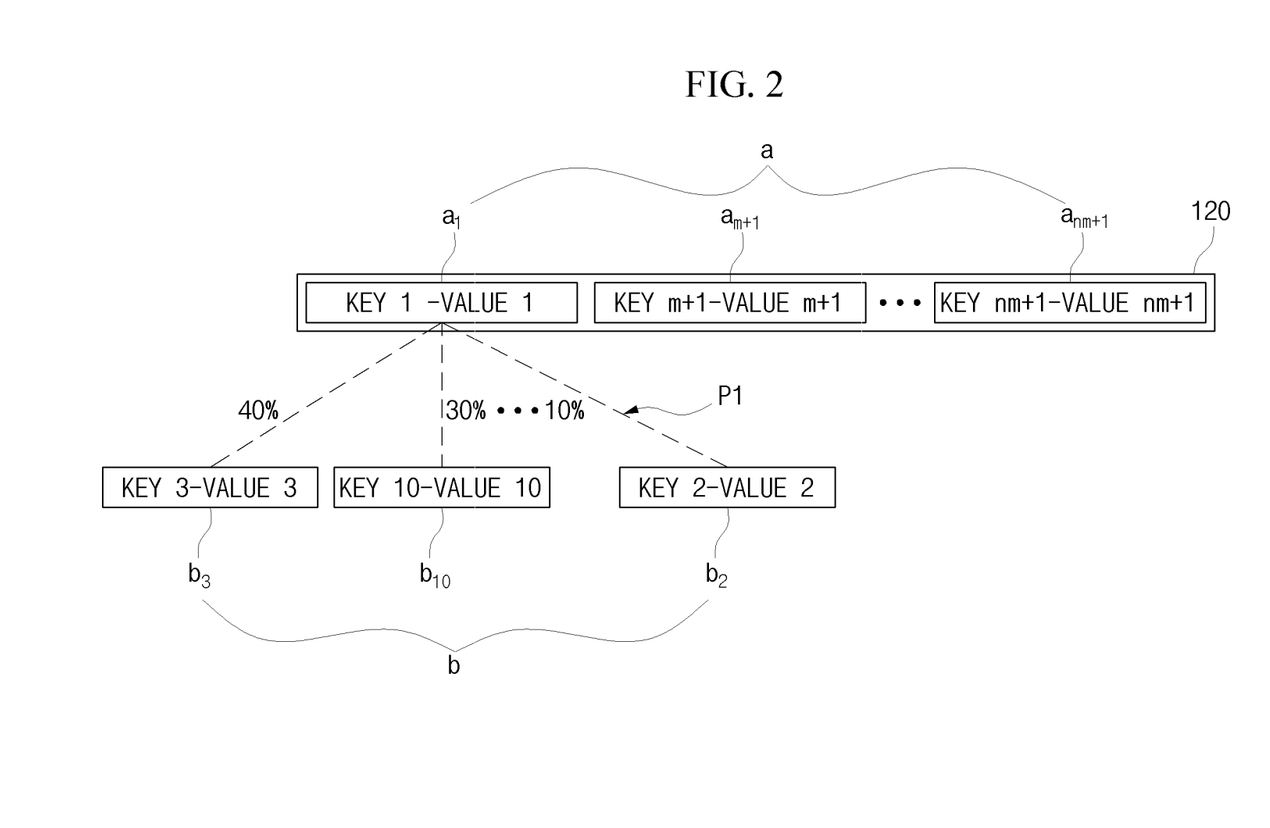
FIG. 2 is a diagram illustrating an example of at least one key-value data stored in a memory and a reference pattern thereof.

FIG. 2 is a diagram illustrating an example of one or more key-value data stored in a memory and a reference pattern thereof.

Each key-value data a may be stored in the memory 120, and a reference pattern P1 for one or more key-value data b which are next referenced by each key-value data a may be stored in the memory 120 based on a probability value.

For example, the key-value data a such as "key 1-value 1" data $a_1$, "key m+1-value m+1" data $a_{m+1}$, "key nm+1-value nm+1" data $a_{nm+1}$, etc. may be stored in the memory 120. In this case, "key 3-value 3" data $b_3$, "key 10-value 10" data $b_{10}$, "key 2-value 2" data $b_2$, etc. which are one or more key-value data which are next referenced by the "key 1-value 1" data $a_1$ may be stored in the memory 120 as the reference pattern P1.

The reference pattern P1 may be stored based on the probability value. The sum of the probability values of the key-value data b in the reference pattern P1 may not exceed 100%.

In FIG. 2, the "key 3-value 3" data $b_3$ having a high probability of 40% of being received as next referenced by the "key 1-value 1" data $a_1$, and the "key 10-value 10" data $b_{10}$ having a probability of 30% of being next referenced may be stored in the memory 120 as the reference pattern P1 for the "key 1-value 1" data $a_1$. This may denote that the probability of receiving the "key 3-value 3" data $b_3$ as a next reference of the "key 1-value 1" data a1 is 40%, and the probability of receiving the "key 10-value 10" data $b_{10}$ is 10%.

In this case, each probability value may be updated by the processor 130 whenever the key-value data b is received.

That is, in an initial state in which the key-value data is not stored in the memory 120, the "key 1-value 1" data may be received, and next, when the "key 2-value 2" data is received, each probability value of the "key 1-value 1" data and the "key 2-value 2" data may be set as 100%.

Next, in a state in which only the "key 1-value 1" data is stored in the memory 120, when the "key 3-value 3" data is received, each of the probability values of the "key 2-value 2" data and the "key 3-value 3" data for the "key 1-value 1" data may be updated as 50%.

The probability value applied to the reference pattern in an exemplary embodiment of the inventive concept may be continuously updated whenever the key-value data is received. In addition, the probability value may be pre-set by a user.

Meanwhile, a transmission delay time table in which the transmission delay time corresponding to the transmission size of the key-value data is mapped may be stored in the memory 120. The processor 130 may update the transmission delay time table stored in the memory 120 when the communication module 110 receives the key-value data.

The transmission delay time table may be stored as the following table.

TABLE

| Transmission data size (Unit: Bytes) | Data transmission delay performance of infiniband (Unit: microseconds(μs)) |
|---|---|
| 2 | 0.90 |
| 4 | 0.89 |
| 8 | 0.91 |
| 16 | 0.91 |
| 32 | 0.92 |
| 64 | 0.98 |
| 128 | 1.08 |
| 256 | 1.48 |
| 512 | 1.70 |
| 1k | 1.71 |
| 2k | 2.18 |
| 4k | 3.10 |
| 8k | 3.75 |
| 16k | 5.04 |
| 32k | 8.03 |
| 64k | 13.16 |
| 128k | 23.43 |
| 256k | 43.99 |
| 512k | 85.18 |

The table represents an actual measurement result of a data transmission delay time of infiniband.

Here, S represents a data transmission size, in this case, assume that a data transmission delay time with respect to data having the size S between two nodes is $T_s$.

As the measurement result shown in the table, the transmission delay time of the data having the sizes S and 2S may have a feature $T_s < T_{2s}$. In particular, when transmitting the data having the size which is equal to or less than 8 Kb, a difference between $T_s$ and $T_{2s}$ may not be great.

The processor 130 may calculate the transmission delay time in a case of prefetching based on the transmission delay time table stored in the memory 120 and the transmission delay time in a case of receiving each of the key-value data without prefetching, and determine whether to prefetch the key-value data.

Meanwhile, the memory 120 may be a non-volatile storage device which continuously maintains stored information even when power is not supplied or a volatile storage device.

For example, the memory 120 may include a compact flash (CF) card, a secure digital (SD) card, a memory stick, a solid-state drive (SSD), a NAND flash memory such as a micro SD card, a magnetic computer storage device such as a hard disk drive (HDD), and an optical disk drive such as a compact disk (CD)-read only memory (ROM), a digital versatile disk (DVD)-ROM, etc.

Further, a program stored in the memory 120 may be implemented in a software form, or in a hardware form such as a field programmable gate array (FPGA) or an application specific integrated circuit (ASIC), etc., and perform predetermined functions.

Referring to FIG. 1 again, the processor 130 may execute the program stored in the memory 120. The processor 130 may confirm whether first key-value data which desires to be received in the memory 120 exists by executing the program. The processor 130 may determine whether to prefetch one or more key-value data corresponding to the first key-value data based on the confirmation result.

In this case, the processor 130 may determine whether to prefetch the key-value data based on the transmission size of the key-value data and the transmission delay time corresponding to the transmission size.

In detail, the processor 130 may not prefetch the one or more key-value data which are next referenced by the first key-value data when it is confirmed that the first key-value data exists in the memory 120. The processor 130 may update the reference pattern for the one or more key-value data which are next referenced by the first key-value data and the probability value corresponding to the reference pattern.

On the other hand, the processor 130 may search for the first key-value data stored in the distributed storage unit 10 when it is confirmed that the first key-value data does not exist in the memory 120, and prefetch one or more key-value data corresponding to the searched key-value data together with the first key-value data. An example in which the first key-value data does not exist in the memory 120 will be described with reference to FIG. 3.

Figure 3:
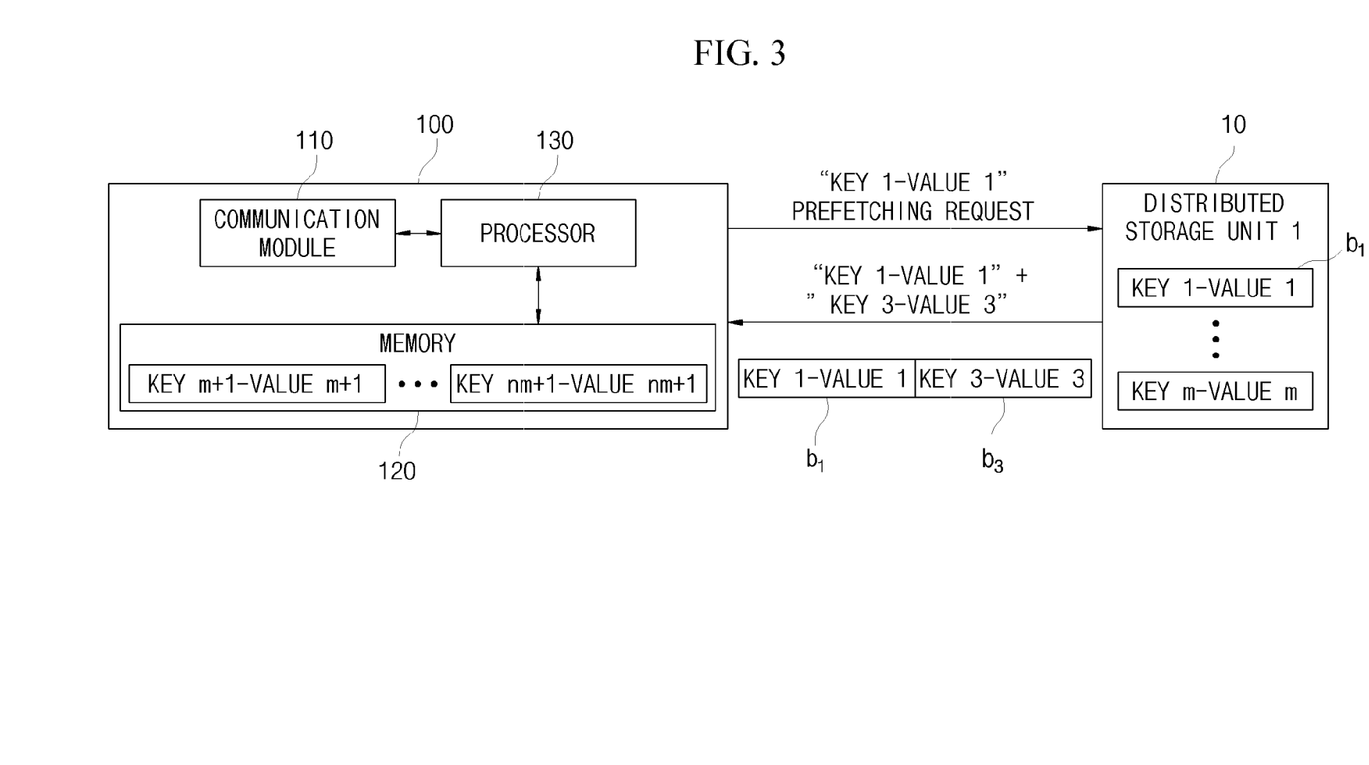
FIG. 3 is a diagram illustrating an example of prefetching key-value data.

FIG. 3 is a diagram illustrating an example of prefetching key-value data.

First, the processor 130 may confirm whether the "key 1-value 1" data exists in the memory 120. When it is confirmed that the "key 1-value 1" data does not exist, the processor 130 may request the prefetching of the "key 1-value 1" data to the distributed storage unit 1 10 in which the "key 1-value 1" data is stored. The processor 130 may simultaneously prefetch by connecting the "key 1-value 1" data $b_1$ and the "key 3-value 3" data $b_3$. The processor 130 receiving the data may store the data in the memory 120 by dividing the "key 1-value 1" data $b_1$ and the "key 3-value 3" data $b_3$.

In this case, the processor 130 may calculate a first transmission delay time in a case of prefetching the first key-value data and the one or more key-value data which are next referenced by the first key-value data, and calculate a second transmission delay time in a case of receiving each of the first key-value data and the one or more key-value data which are next referenced by the first key-value data.

The processor 130 may prefetch the one or more key-value data which are next referenced together with the first key-value data when the first transmission delay time is smaller than the second transmission delay time.

The processor 130 may calculate the first transmission delay time and the second transmission delay time, respectively, based on the transmission delay time table stored in the memory 120.

In detail, the first transmission delay time $T_{2s}$ and the second transmission delay time $T_s \times (p \times T_s')$ may be calculated by the following Equation 1.

$$T_s \times (p \times T_s') > T_{2s} \quad \text{[Equation 1]}$$

Here, $T_s$ represents a transmission delay time of the first key-value data, $T_s'$ represents a transmission delay time of the key-value data which is next referenced, and p represents a probability value applied to the reference pattern of the key-value data which is next referenced. Further, $T_{2s}$ represents a transmission delay time in a case in which the first key-value data and the key-value data which is next referenced are simultaneously prefetched.

For example, when applying the transmission delay time shown in the Table by assuming that each key-value data has an equal size of 512 Kb, and the probability value p of the key-value data which is next referenced is 40%, the first transmission delay time may be calculated as 1.71 us and the second transmission delay time may be calculated as 1.768 us.

Accordingly, when it is calculated that the first transmission delay time is smaller than the second transmission delay time, since it is more effective to prefetch the first key-value data together with the key-value data which is next referenced compared with the case of receiving the key-value data which is next referenced separately, the processor 130 may simultaneously prefetch the first key-value data and the key-value data which is next referenced.

Meanwhile, when receiving n key-value data pairs, the first transmission delay time $T_{(n+1)s}$ and the second transmission delay time $T_s \times (p_n \times T_s')$ may be calculated by the following Equation 2.

$$T_s \times (p_n \times T_s') > T_{(n+1)s} \qquad \text{[Equation 2]}$$

In Equation 2, $P_n$ represents the probability value of the key-data pair having an n-th order when arranging the key-value data in a descending order based on the probability value in the reference pattern.

The processor 130 may perform the prefetching when the transmission delay time when simultaneously receiving n+1 key-value data is smaller than the transmission delay time of additionally referencing the key-value data having the lowest probability value without prefetching in a case of prefetching the n key-value data pairs together with the first key-value data.

For example, when applying the transmission delay time shown in the Table by assuming that each key-value data has a size of 512 Kb, and the probability value $p_n$ of the key-value data having the lowest probability value among four key-value data pairs which are next referenced is 10%, the first transmission delay time may be calculated as 2.18 us, and the second transmission delay time may be calculated as 1.717 us.

Accordingly, when it is calculated that the first transmission delay time is greater than the second transmission delay time, the processor 130 may not perform the prefetching since it is more effective to receive the key-value data which is next referenced separately compared with the case of prefetching the first key-value data together with the key-value data which is next referenced.

Through the operation described above, when prefetching the first key-value data and the key-value data which is next referenced or receiving the data, respectively, the processor 130 may update the reference pattern for the one or more key-value data which are next referenced by the first key-value data and the probability value corresponding to the reference pattern.

According to the local processing apparatus 100 according to an exemplary embodiment of the inventive concept, the one or more key-value data which are next referenced may be prefeteched considering the reference pattern stored in the memory 120 based on the probability value.

Accordingly, the data tranceiving efficiency may be improved by decreasing the communication network load occurring when prefetching the key-value data from the distributed storage unit 10 located in the remote place.

For reference, the components shown in FIG. 1 according to an exemplary embodiment of the inventive concept may be implemented in a software form, or in a hardware form such as the FPGA or the ASIC, etc., and perform predetermined functions.

However, the components are not limited to software or hardware, and each component may be configured to be included in an addressable storage medium, and to play the role of one or more processors.

Accordingly, as an example, the component may include software components, object-oriented software components, class components, task components, processors, functions, attributes, procedures, sub-routines, segments of a program code, drivers, firmware, microcodes, a circuit, data, a database, data structures, tables, arrays, and parameters.

The components and the functions provided by corresponding components may be combined as a smaller number of components, or be further divided into additional components.

Hereinafter, a data transceiving method in the local processing apparatus 100 according to an exemplary embodiment of the inventive concept will be described with reference to FIG. 4.

Figure 4:
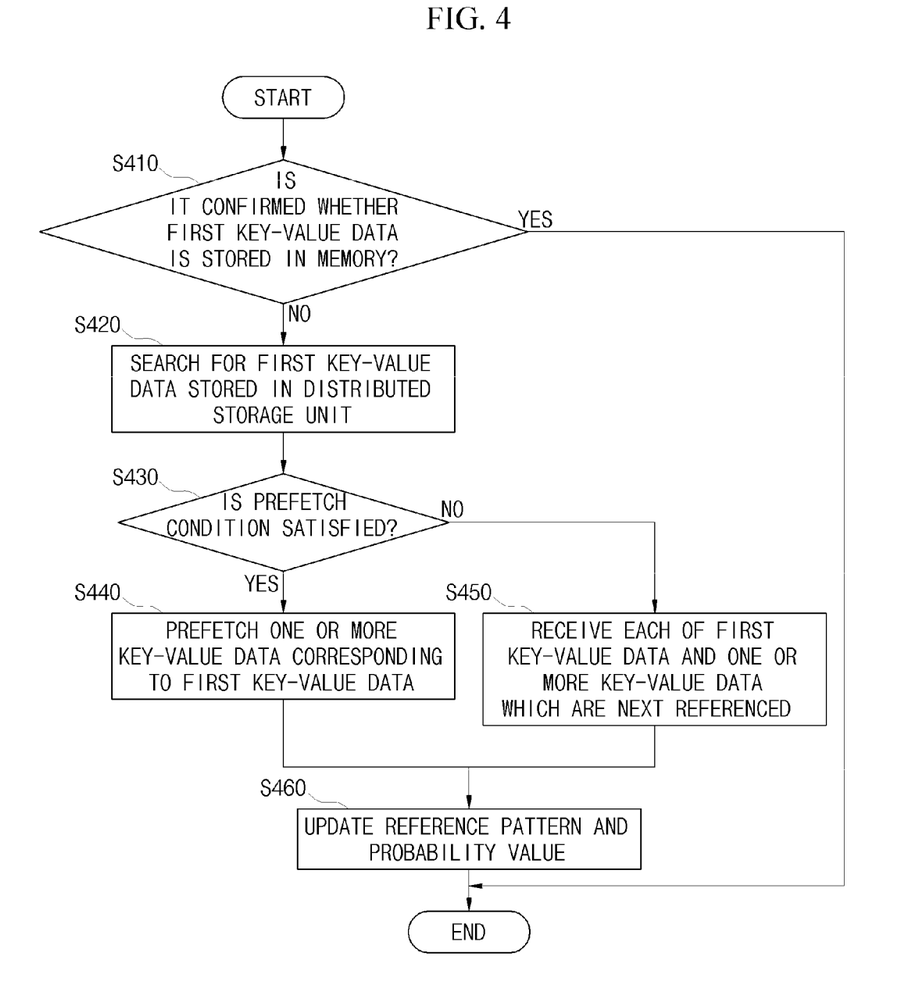
FIG. 4 is a flowchart for describing a data transceiving method according to an exemplary embodiment of the inventive concept.

FIG. 4 is a flowchart for describing a data transceiving method according to an exemplary embodiment of the inventive concept.

The data transceiving method of the local processing apparatus 100 for transceiving data with the one or more distributed storage units 10 in which the one or more key-value data pairs are stored, respectively, according to an exemplary embodiment of the inventive concept may first confirm whether the first key-value data is stored in the memory 120 of the local processing apparatus 100 (S410).

In this case, when the first key-value data is stored in the memory 120, the local processing apparatus 100 may not prefetch the one or more key-value data which are next referenced, and update the reference pattern for the one or more key-value data which are next referenced by the first key-value data and the probability value corresponding to the reference pattern (S460).

On the other hand, when the first key-value data is not stored in the memory 120, the local processing apparatus 100 may search for the first key-value data stored in the distributed storage unit 10 (S420), and determine whether to prefetch the one or more key-value data corresponding to the searched first key-value data together with the first key-value data (S430).

In this case, a prefetching condition may be a case in which the first transmission delay time in the case in which the first key-value data and the one or more key-value data which are next referenced by the first key-value data are prefetched is smaller than the second transmission delay time in the case in which each of the first key-value data and the one or more key-value data which are next referenced by the first key-value data is received.

The local processing apparatus 100 may prefetch the one or more key-value data corresponding to the first key-value data when the prefetching condition is satisfied, that is, when the first transmission delay time is smaller than the second transmission delay time (S440).

On the other hand, the local processing apparatus 100 may receive each of the first key-value data and the one or more key-value data which are next referenced when the prefetching condition is not satisfied (S450).

Accordingly, when the reception of the first key-value data and the one or more key-value data which are next referenced is completed, the local processing apparatus 100 may update the reference pattern for the one or more key-value data which are next referenced by the first key-value data and the probability value corresponding to the reference pattern (S460).

In the above-description, the operations S410 to S460 may be further divided into additional operations or be combined as a smaller number of operations according to an implementation example of the inventive concept. Further, a portion of the operations may be omitted according to need, and the sequence of the operations may also be changed. Moreover, although omitted, the explanation described above with respect to the local processing apparatus 100 with reference to FIGS. 1 to 3 may be also applied to the data transceiving method shown in FIG. 4.

Meanwhile, the data transceiving method of the local processing apparatus 100 according to an exemplary embodiment of the inventive concept may be implemented by a computer program stored in a medium which is executed by a computer, or in a form of a recording medium including an instruction which is executable by the computer. The computer readable medium may be any available medium which is accessible by the computer, and include volatile and non-volatile media, and removable and non-removable media. Further, the computer readable medium may include a computer storage medium and a communication medium. The computer storage medium may include volatile and non-volatile media and removable and non-removable media implemented by any method and technology of storing information such as a computer-readable instruction, a data structure, a program module, or other data. The communication medium may include other data or other transmission mechanisms of a modulated data signal such as a computer readable instruction, a data structure, a program module or a carrier wave, and include any information transmission medium.

While the method and the system of the inventive concept are described with reference to a specific exemplary embodiment, all or a portion of the components or the operations may be implemented by using a computer system having a general-purpose hardware architecture.

According to the inventive concept, the one or more key-value data which are next referenced may be prefeteched by considering the reference pattern stored based on the probability value.

Accordingly, the data transceiving efficiency can be improved by decreasing the communication network load occurring when prefetching the key-value data from the distributed storage unit located in the remote place.

While the exemplary embodiments of the inventive concept are described in detail above, it will be understood by those of ordinary skill in the art that various changes and modifications in form and details may be made therein without departing from the spirit and scope as defined by the following claims. Therefore, it will be understood that the exemplary embodiments described above are merely examples in every aspect, and the inventive concept is not limited thereto. For example, each component described in a single type may be implemented in a distributed type, and similarly, components described in the distributed type may be implemented in a combined type.

The scope of the inventive concept should be defined by claims, and it is intended that the inventive concept covers all such modifications and changes by those of ordinary skill in the art derived from a basic concept of the appended claims, and their equivalents.

What is claimed is:

1. A local processing apparatus transceiving data with one or more distributed storage units in which one or more key-value data pairs are stored, respectively, the local processing apparatus comprising:
    a communication module configured to transceive the data with the one or more distributed storage units;
    a memory configured to store a program for transceiving the data and the one or more key-value data pairs; and
    a processor configured to execute the program,
    wherein the processor confirms whether a first key-value data exists in the memory by executing the program, and determines whether to prefetch one or more key-value data corresponding to the first key-value data based on the confirmation result,
    wherein a reference pattern for the one or more key-value data which are next referenced by each key-value data is stored in the memory based on a probability value,
    wherein the processor determines whether to prefetch the key-value data based on a transmission size of the key-value data and a transmission delay time corresponding to the transmission size, and
    wherein, when it is confirmed that the first key-value data does not exist, the processor searches for the first key-value data stored in the distributed storage unit, and prefetches the one or more key-value data corresponding to the searched first key-value data together with the first key-value data, and
    wherein the processor performs the prefetching when a first transmission delay time in a case of prefetching the first key-value data and the one or more key-value data which are next referenced by the first key-value data is smaller than a second transmission delay time in a case of receiving the first key-value data and the one or more key-value data which are next referenced by the first key-value data, respectively.

2. The local processing apparatus of claim 1, wherein the communication module transceives the data with the one or more distributed storage units through infiniband supporting a remote direct memory access (RDMA).

3. The local processing apparatus of claim 1, wherein the second transmission delay time is calculated based on a transmission delay time of the first key-value data and a transmission delay time and a probability value of a key-value data having the lowest probability value among the one or more key-value data which are next referenced.

4. The local processing apparatus of claim 1, wherein the processor updates the probability value corresponding to the reference pattern for the one or more key-value data which are next referenced by the first key-value data.

5. The local processing apparatus of claim 1, wherein, when it is confirmed that there first key-value data exists, the processor does not prefetch the one or more key-value data which are next referenced by the first key-value data, and updates the probability value corresponding to the reference pattern for the one or more key-value data which are next referenced by the first key-value data.

6. The local processing apparatus of claim 1, wherein a transmission delay time table, in which a transmission delay time corresponding to a transmission size of the key-value data is mapped, is stored in the memory, and
    wherein the processor updates the transmission delay time table when the communication module receives the key-value data.

7. The local processing apparatus of claim 1, wherein the reference pattern denotes a probability of receiving each of the one or more key-value data corresponding to the first key-value data as a next reference of the first key-value data.

8. A data transceiving method of a local processing apparatus transceiving data with one or more distributed storage units in which one or more key-value data pairs are stored, respectively, the data transceiving method comprising:
    confirming whether a first key-value data is stored in a memory of the local processing apparatus; and
    determining whether to prefetch one or more key-value data corresponding to the first key-value data based on the confirmation result, wherein a reference pattern for the one or more key-value data which are next referenced by each key-value data is stored in the memory, whether to prefetch the one or more key-value data is determined based on a transmission size of the key-value data and a transmission delay time corresponding to the transmission size, wherein, when it is confirmed that the first key-value data is not stored in the memory, the data transceiving method further comprises:

searching for the first key-value data stored in a distributed storage unit; and     prefetching one or more key-value data corresponding to the searched first key-value data together with the first key-value data, and wherein the determining whether to prefetch the one or more key-value data performs the prefetching when a first transmission delay time in a case of prefetching the first key-value data and the one or more key-value data which are next referenced by the first key-value data is smaller than a second transmission delay time in a case of receiving the first key-value data and the one or more key-value data which are next referenced by the first key-value data, respectively.

9. The data transceiving method of claim 8, wherein, when it is confirmed that the first key-value data is not stored in the memory, the data transceiving method further comprises:

updating a probability value corresponding to the reference pattern for the one or more key-value data which are next referenced by the first key-value data.

10. The data transceiving method of claim 8, wherein when it is confirmed that the first key-value data is stored in the memory, the data transceiving method further comprises updating a probability value corresponding to the reference pattern for the one or more key-value data which are next referenced by the first key-value data, and     wherein the one or more key-value data which are next referenced by the first key-value data are not prefetched.

11. The local processing apparatus of claim 1, wherein the processor further determines whether to prefetch the key-value data based on the probability value.

* * * * *